US012697727B2

(12) United States Patent
Shannon et al.

(10) Patent No.: US 12,697,727 B2
(45) Date of Patent: Aug. 4, 2026

(54) SYSTEMS, DEVICES, AND METHODS FOR CONTACT DETECTION BY A ROBOT SYSTEM

(71) Applicant: Sanctuary Cognitive Systems Corporation, Vancouver (CA)

(72) Inventors: Connor Richard Shannon, Vancouver (CA); Kevin Jiaming Wu, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 15 days.

(21) Appl. No.: 18/640,728

(22) Filed: Apr. 19, 2024

(65) Prior Publication Data

US 2024/0351211 A1 Oct. 24, 2024

Related U.S. Application Data

(60) Provisional application No. 63/461,024, filed on Apr. 21, 2023.

(51) Int. Cl.
| | |
|---|---|
| *B25J 9/00* | (2006.01) |
| *B25J 9/16* | (2006.01) |
| *B25J 11/00* | (2006.01) |
| *B25J 13/08* | (2006.01) |

(52) U.S. Cl.
CPC ......... *B25J 9/1676* (2013.01); *B25J 11/0005* (2013.01); *B25J 13/084* (2013.01); *B25J 13/089* (2013.01)

(58) Field of Classification Search
CPC .... B25J 9/1676; B25J 11/0005; B25J 13/084; B25J 13/086; B25J 13/089; B25J 19/06
See application file for complete search history.

(56) References Cited

U.S. PATENT DOCUMENTS

| | | | | |
|---|---|---|---|---|
| 10,603,798 B2 * | 3/2020 | Fujita | ..................... | B25J 9/1676 |
| 2013/0345874 A1 * | 12/2013 | Blumberg | .............. | B25J 9/1676 |
| | | | | 901/47 |
| 2018/0218585 A1 * | 8/2018 | Schwabenthan | ........ | B66C 13/18 |
| 2020/0001460 A1 * | 1/2020 | Sato | ....................... | B25J 9/1676 |
| 2020/0198148 A1 * | 6/2020 | Ueno | ..................... | B25J 9/1697 |
| 2021/0154847 A1 * | 5/2021 | Shinohara | ................ | B25J 13/06 |
| 2022/0362944 A1 * | 11/2022 | Zamani | .................... | B25J 13/00 |
| 2023/0001568 A1 * | 1/2023 | Vannuffelen | ............. | B25J 19/06 |

* cited by examiner

*Primary Examiner* — Dalena Tran
(74) *Attorney, Agent, or Firm* — Thomas Mahon

(57) ABSTRACT

A robot has a controller and a sensor. The sensor is communicatively coupled to the controller. The controller includes a contact response system. A safety response of the contact response system is activated for the sensor. A method of operation of the robot includes detecting, by the sensor, a contact between the robot and a human, the contact resulting from a motion of the robot, and determining, by the controller, whether the contact between the robot and the human is an expected or unexpected contact. In response to determining the contact between the robot and the human is an expected contact, the safety response is deactivated for the sensor to allow the robot to proceed with its motion uninterrupted. In response to determining the contact between the robot and the human is an unexpected contact, the contact response system causes the robot to interrupt the motion of the robot.

17 Claims, 7 Drawing Sheets

108

400

406

From 404 of Figure 4A

416

No

Capacitance
threshold
exceeded?

Yes

To 408 of Figure
4A

SYSTEMS, DEVICES, AND METHODS FOR CONTACT DETECTION BY A ROBOT SYSTEM

TECHNICAL FIELD

The present systems, devices, and methods generally relate to controlling expected and unexpected contacts between a robot system and one or more object(s) in its environment, and, in particular, to controlling expected and unexpected physical contacts between a humanoid robot and one or more human being(s).

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots are stationary robots. Stationary robots are not mobile and typically operate at a fixed location. Examples include stationary robots at a manufacturing plant.

Other robots are mobile robots. Mobile robots are capable of locomotion. Examples include mobile rescue robots, fire-fighting robots, and robots able to mimic human behaviour. Some mobile robots are self-propelled. Some self-propelled mobile robots are capable of autonomous motion.

Some mobile robots are wheeled robots. Other mobile robots are legged robots. Legged robots may be one-legged, two-legged, or many-legged. A two-legged robot is also referred to in the present application as a bipedal robot. A bipedal robot may be a humanoid robot, for example. Legged robots may be more challenging to implement than wheeled robots, but can provide advantages, for example, on uneven terrain, stairs, and other places requiring agility in motion, as well as for accessing places designed for human access.

BRIEF SUMMARY

A method of operation of a robot, the robot comprising a controller and a first sensor, the first sensor communicatively coupled to the controller and the controller comprising a contact response system, wherein a safety response of the contact response system is activated for the first sensor, may be summarized as comprising detecting, by the first sensor, a first contact between the robot and a first human, the first contact resulting from a first motion of the robot, determining, by the controller, the first contact between the robot and the first human is an unexpected contact, and in response to determining, by the controller, the first contact between the robot and the first human is an unexpected contact, causing, by the contact response system, the robot to interrupt the first motion of the robot.

In some implementations, the robot further comprises a second sensor, the second sensor communicatively coupled to the controller and the safety response of the contact response system activated for the second sensor, the method further comprises detecting, by the second sensor, a second contact between the robot and a second human, the second contact resulting from a second motion of the robot, determining, by the controller, the second contact between the robot and the second human is an expected contact, and in response to determining, by the controller, the second contact between the robot and the second human is an expected contact, allowing, by the contact response system, the robot to proceed uninterrupted with the second motion of the robot.

In some implementations, the allowing, by the controller, the robot to proceed uninterrupted with the second motion of the robot includes deactivating the safety response of the contact response system for the second sensor.

In some implementations, the second sensor is a contact sensor and detecting, by the second sensor, a second contact between the robot and the second human includes detecting the robot and the second human have established contact with each other.

In some implementations, the second sensor is a proximity sensor and detecting, by the second sensor, a second contact between the robot and the second human includes determining a distance between the robot and the second human is less than a predetermined proximity threshold. The determining, by the controller, the second contact between the robot and the second human is an expected contact may include tracking a trajectory of at least one of the robot and the second human, and determining the robot and the second human are on a course to establish contact with each other unless the second motion of the robot is interrupted.

In some implementations, the second human is the first human.

In some implementations, the second sensor is a capacitive touch sensor, and the detecting, by the second sensor, a second contact between the robot and a second human includes determining a capacitance exceeds a predetermined capacitance threshold.

In some implementations, the second sensor is a capacitance sensor, and the detecting a second contact between the robot and the second human includes detecting a second contact between the robot and an area of exposed human skin of the second human.

In some implementations, the second sensor is a capacitance sensor, and the detecting a second contact between the robot and the second human includes detecting a second contact between the robot and an area of clothed human skin of the second human.

In some implementations, the determining, by the controller, the second contact between the robot and the second human is an expected contact includes determining the second contact between the robot and the second human is an element of a planned interaction between the robot and the second human.

In some implementations, the robot is a mobile robot.

In some implementations, the first sensor is a contact sensor and the detecting, by the first sensor, a first contact between the robot and the first human includes detecting the robot and the first human have established contact with each other.

In some implementations, the first sensor is a proximity sensor and the detecting, by the first sensor, a first contact between the robot and the first human includes determining a distance between the robot and the first human is less than a predetermined proximity threshold. The determining, by the controller, the first contact between the robot and the first human is an unexpected contact may include tracking a trajectory of at least one of the robot and the first human, and determining the robot and the first human are on a course to establish contact with each other unless the first motion of the robot is interrupted.

In some implementations, the first sensor is a capacitive touch sensor, and the detecting, by the first sensor, a first contact between the robot and a first human includes determining a capacitance exceeds a predetermined capacitance threshold.

In some implementations, the first sensor is a capacitance sensor, and the detecting a first contact between the robot and the first human includes detecting a first contact between the robot and an area of exposed human skin of the first human.

In some implementations, the first sensor is a capacitance sensor, and the detecting a first contact between the robot and the first human includes detecting a first contact between the robot and an area of clothed human skin of the first human.

In some implementations, the allowing, by the contact response system, the robot to interrupt the first motion of the robot includes causing by the contact response system the robot to halt the first motion of the robot.

A method of operation of a robot, the robot comprising a controller and a sensor, the sensor communicatively coupled to the controller and the controller comprising a contact response system, wherein a safety response of the contact response system is activated for the sensor, may be summarized as comprising detecting, by the sensor, a contact between the robot and a human, the contact resulting from a motion of the robot, determining, by the controller, whether the contact between the robot and the human is an expected contact or an unexpected contact, in response to determining, by the controller, the contact between the robot and the human is an expected contact, allowing, by the contact response system, the robot to proceed uninterrupted with the motion of the robot, and in response to determining, by the controller, the contact between the robot and the human is an unexpected contact, causing, by the contact response system, the robot to interrupt the motion of the robot.

In some implementations, the allowing, by the controller, the robot to proceed uninterrupted with the motion of the robot includes deactivating the safety response of the contact response system for the sensor.

In some implementations, the robot is a mobile robot.

In some implementations, the sensor is a contact sensor and the detecting, by the sensor, a contact between the robot and the human includes detecting the robot and the human have established contact with each other.

In some implementations, the sensor is a proximity sensor and the detecting, by the sensor, a contact between the robot and the human includes determining a distance between the robot and the human is less than a predetermined proximity threshold. The determining, by the controller, whether the contact between the robot and the human is an expected contact or an unexpected contact may include tracking a trajectory of at least one of the robot and the human, and determining the robot and the human are on a course to establish contact with each other unless the motion of the robot is interrupted. The determining the robot and the human are on a course to establish contact with each other unless the motion of the robot is interrupted may include performing, by the robot, a visual check to verify a presence of the human within the predetermined proximity threshold from the robot.

In some implementations, the sensor is a capacitive touch sensor, and the detecting, by the sensor, a contact between the robot and a human includes determining a capacitance exceeds a predetermined capacitance threshold.

In some implementations, the sensor is a capacitance sensor, and the detecting a contact between the robot and the human includes detecting a contact between the robot and an area of exposed human skin of the human.

In some implementations, the sensor is a capacitance sensor, and the detecting a contact between the robot and the human includes detecting a contact between the robot and an area of clothed human skin of the human.

In some implementations, the causing by the contact response system the robot to interrupt the motion of the robot includes causing by the contact response system the robot to halt the motion of the robot.

A robot may be summarized as comprising a first sensor, the first sensor for detecting a first contact between the robot and a first human, the first contact resulting from a first motion of the robot, and a controller, the controller communicatively coupled to the first sensor, the controller comprising a contact response system, a safety response of the contact response system activated for the first sensor, wherein the controller is operable to determine the first contact between the robot and the first human is an unexpected contact, and in response to the controller determining the first contact between the robot and the first human is an unexpected contact, the contact response system is operable to cause the robot to interrupt the first motion of the robot.

In some implementations, the robot further comprises a second sensor, the second sensor for detecting a second contact between the robot and a second human, the second contact resulting from a second motion of the robot, the second sensor communicatively coupled to the controller and the safety response of the contact response system activated for the second sensor, wherein the controller is operable to determine the second contact between the robot and the second human is an expected contact, and in response to the controller determining the second contact between the robot and the second human is an expected contact, the contact response system is operable to allow the contact response system to cause the robot to proceed uninterrupted with the second motion of the robot. The contact response system may be operable to deactivate the safety response of the contact response system of the second sensor to allow the contact response system to cause the robot to proceed uninterrupted with the second motion of the robot.

In some implementations, the second sensor includes a contact sensor for detecting the robot and the second human have established contact with each other.

In some implementations, the second sensor includes a proximity sensor for determining a distance between the robot and the second human is less than a predetermined proximity threshold. The controller may be operable to track a trajectory of at least one of the robot and the second human, and determine the robot and the second human are on a course to establish contact with each other unless the second motion of the robot is interrupted.

In some implementations, the second human is the first human.

In some implementations, the second sensor includes a capacitive touch sensor for detecting the second contact between the robot and the second human by determining a capacitance exceeds a predetermined capacitance threshold. The capacitance sensor may be operable to detect the second contact between the robot and an area of exposed human skin of the second human. The capacitance sensor may be operable to detect the second contact between the robot and an area of clothed human skin of the second human.

In some implementations, the controller is operable to determine the second contact between the robot and the second human is an element of a planned interaction between the robot and the second human.

In some implementations, the robot is a mobile robot.

In some implementations, the first sensor is a contact sensor for detecting the robot and the first human have established contact with each other.

In some implementations, the first sensor is a proximity sensor for determining a distance between the robot and the first human is less than a predetermined proximity threshold. The controller may be operable to track a trajectory of at least one of the robot and the first human, and determine the robot and the first human are on a course to establish contact with each other unless the first motion of the robot is interrupted. The robot may further comprise a visual sensor to verify a presence of the first human within the predetermined proximity threshold.

In some implementations, the first sensor is a capacitive touch sensor for detecting the first contact between the robot and the first human by determining a capacitance exceeds a predetermined capacitance threshold. The capacitance sensor may be operable to detect the first contact between the robot and an area of exposed human skin of the first human. The capacitance sensor may be operable to detect the first contact between the robot and an area of clothed human skin of the first human.

In some implementations, the contact response system is operable to cause the robot to interrupt the first motion of the robot by causing the robot to halt the first motion of the robot.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1A:
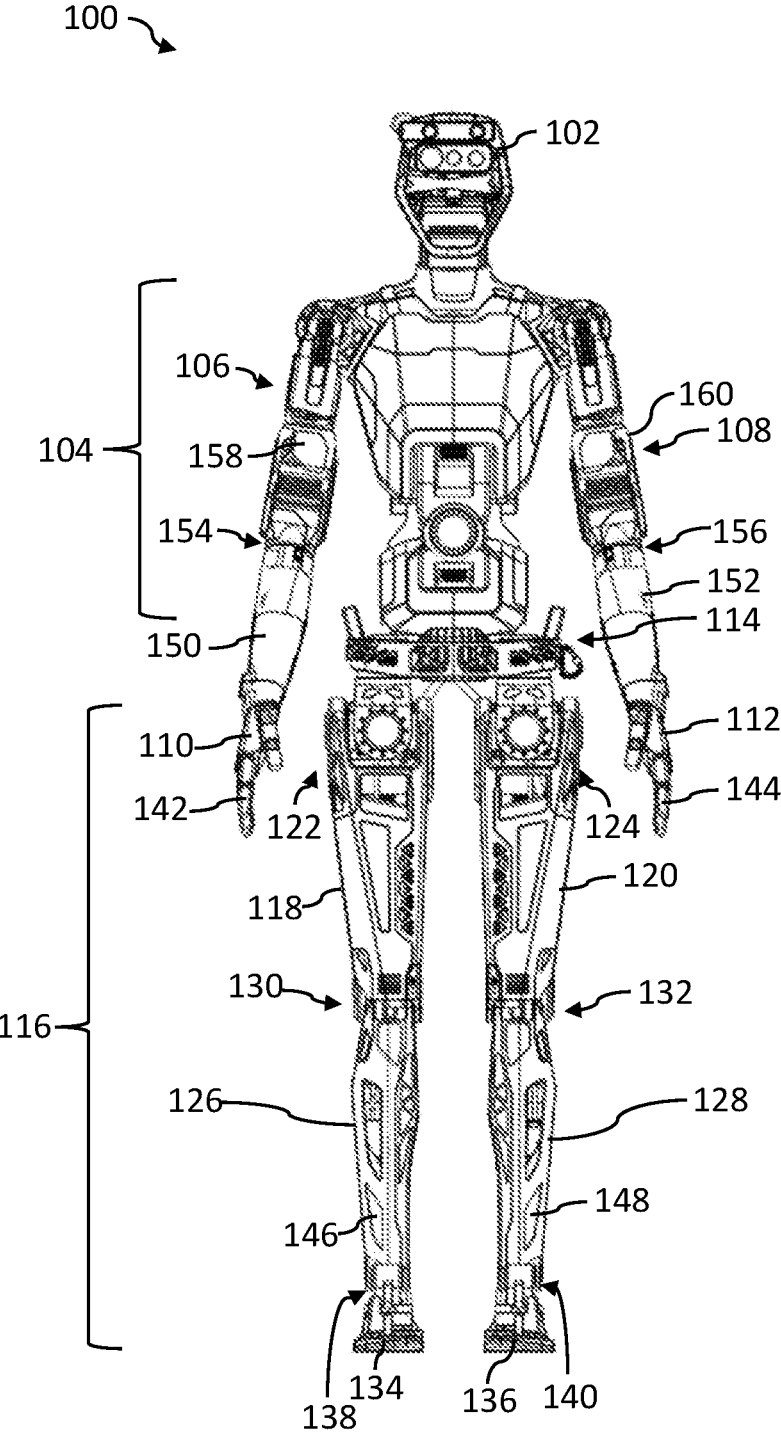
FIG. 1A is a schematic drawing of a front view of a robot, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

In some implementations, a robot is a humanoid robot; that is, the robot has an appearance and/or a character resembling that of a human. The humanoid robot may be "humanoid" in its entirety or may have humanoid components (e.g., a torso, head, arms, and hands) coupled to non-humanoid components (e.g., a wheeled base). In some implementations, the humanoid robot is a bipedal robot. The humanoid robot may be untethered (i.e., not physically coupled, tied, or fastened to anything), able to mimic the complex movements of humans, and/or free to move around its environment. In some implementations, the humanoid robot may be capable of autonomous movement and action.

The technology described herein includes systems and methods for a robot capable of motion and/or in an environment where other actors in the environment are capable of motion. The other actors may include humans. During operation of the robot, the robot may come into contact with humans. Sometimes, the contact is expected, and, at other times, the contact is unexpected. A contact may be an actual contact in which physical contact is established between the robot and the human, or the contact may be a proximity of the robot to the human.

It may be desirable for the robot to include a safety response operable to interrupt a motion of the robot in response to a contact with a human and/or an imminent contact with a human. This may be for the safety of the human, the robot, or both. Interrupting the motion of the robot may include changing the motion of the robot. Interrupting the motion of the robot may include halting the motion of the robot. In some situations, it may be desirable to halt the motion of the robot immediately in response to a detection of a contact with a human or an imminent contact with a human. Whether a contact triggers a safety response may depend on context. If the safety response includes interrupting the motion of the robot, then whether the motion of the robot is interrupted or is allowed to continue may depend on context. Determining the context may include determining whether the contact is expected or unexpected.

An unexpected contact with a human is a contact with a human that occurs when the robot is a) not knowingly interacting with a human, and/or b) not executing a task, a motion, or a plan that includes an intent to interact with a human. It may be desirable in such circumstances for the robot to interrupt a motion of the robot if an actual or imminent contact with a human is unexpectedly detected.

Detecting an unexpected contact may include a) detecting an unexpected contact has occurred, and/or b) detecting an unexpected contact is imminent. If an unexpected contact is imminent, it may be desirable for the robot to take avoiding action in response to the imminent contact, for example, by interrupting a motion of the robot.

An expected contact with a human is a contact with a human that occurs when the robot is a) knowingly interacting with a human, and/or b) executing a task, a motion, or a plan that includes an intent to interact with a human, for example, when the contact is an element of a planned interaction. It may be desirable in such circumstances for the robot to a) deactivate a safety response that, if activated, would have interrupted a motion of the robot upon detection of the actual or imminent contact with a human, and b) allow the interaction with the human to proceed without interruption.

In some implementations, deactivation of the safety response includes deactivation of one or more sensors.

Deactivation of the safety response for one or more sensors in response to an expected contact may be temporary. The safety response may be re-activated, for example, a) when a preset timer expires, and/or b) when a signal from the sensor ceases to indicate there is contact (or imminent contact) with a human.

In some implementations, the safety response includes or uses sensors on a body of a robot for the purpose of identifying when a contact is made by the robot with a human. A contact may be a direct contact with an area of exposed skin of the human, or an indirect contact, for example, a contact with an area of clothed skin of the human.

In some implementations, the sensors may be strategically positioned about the body of the robot. For example, the sensors may be located at places on the body of the robot that a) would be dangerous to the human if they were to strike or collide with the human, and/or b) are more vulnerable for the robot. In some implementations, sensors are located in impact zones, for example, at elbows, at an outside edge of a hand, at an outside edge of a forearm, at knees, shoulders, and the like. In some implementations, sensors are located at pinch zones, for example, inside an elbow, in an armpit, in between the fingers, and the like.

In some implementations, when a contact between the robot and a human is expected in the course of executing a task, the safety response is deactivated only for a specific subset of sensors, e.g., sensors located where contact is expected, and/or only for a limited period of time.

In some implementations, the sensors include visual sensors. Visual sensors may be used to trigger a safety response by visually recognizing the presence of a human.

In some implementations, the sensors include capacitive touch sensors. Capacitive touch sensors may be deployed, for example, in the robot's "blind spots", i.e., at locations on the robot where a contact with a human may occur when the human is out of view of the visual sensors, e.g., behind the back of a humanoid robot.

In some implementations, the capacitive touch sensors are in communication with a motion controller that is operable to interrupt a motion of the robot automatically in the event that a signal from one or more of the capacitive touch sensors is detected, e.g., if the signal exceeds a predetermined threshold.

In some implementations, interrupting a motion of the robot can include interrupting multiple motions. Interrupting a motion of the robot may include interrupting all motions of the robot. In one example implementation, motion of the arms and upper body is interrupted immediately in the event of a contact being detected by one or more sensor(s) located on the arm(s) and/or upper body. In this scenario, motion of the lower body may be permitted to continue and/or may be changed to allow the robot to maintain its balance.

In some implementations, a sensitivity of one or more capacitive touch sensors can be tuned to detect a direct contact with an area of exposed skin of a human (e.g., analogous to a conventional capacitive touchscreen of a smartphone or tablet computer). In some implementations, a sensitivity of one or more capacitive touch sensors can be tuned to detect indirect contact, e.g., contact with an area of clothed skin of the human. In some implementations, a sensitivity of one or more capacitive touch sensors is tuned to adjust a ratio of false positive detections to false negative detections.

In some implementations, a response by the robot to an unexpected contact includes performing a visual check by at least one of the visual sensors to determine whether a human can be recognized in the field of view of the visual sensor in proximity to the robot.

A mobile robot system may include a robot and a mobile base. In some implementations, the robot and the mobile base are capable of independent travel in an environment. In some implementations, the robot may be transported by the mobile base. In some implementations, the robot is a bipedal humanoid robot. In some implementations, the robot is a bipedal humanoid robot capable of walking, and of stepping on and off a platform on the mobile base. In some implementations, the mobile base is a mobile docking station to which the robot can return for various needs that can include charging, data processing, servicing, and maintenance. There may or may not be a tethered connection between a robot and a mobile base.

The degree of mobility of the mobile robot system may vary. For example, some mobile robot systems may be constrained to move along a fixed track. Others may, for example, be capable of autonomous and unconstrained movement in their environment. The mobile base may be a wheeled mobile base. The base may carry various components in support of robot operation, for example, components of a hydraulic system, a controller, computing resources, a battery, an electric motor, etc. The base may serve as a mobile ancillary unit capable of carrying components that would otherwise be too bulky or heavy to include in the robot.

An advantage of a bipedal robot is that it can bend forward to pick up an object, for example. In some implementations, a bipedal robot is able to articulate its legs and torso at one or more joints to interact with the ground, and with objects on the ground or low to the ground. For example, a bipedal robot may be able to bend the torso, as well as bend at the waist, the hips, the knees and/or the ankles. This capability can increase the range of work that can be assigned to the robot. In some implementations, the robot is an autonomous walking biped robot.

FIG. 1A is a schematic drawing of a front view of a robot 100, in accordance with the present systems, devices, and methods. In some implementations, robot 100 is capable of autonomous travel (e.g., via bipedal walking).

Figure 1B:
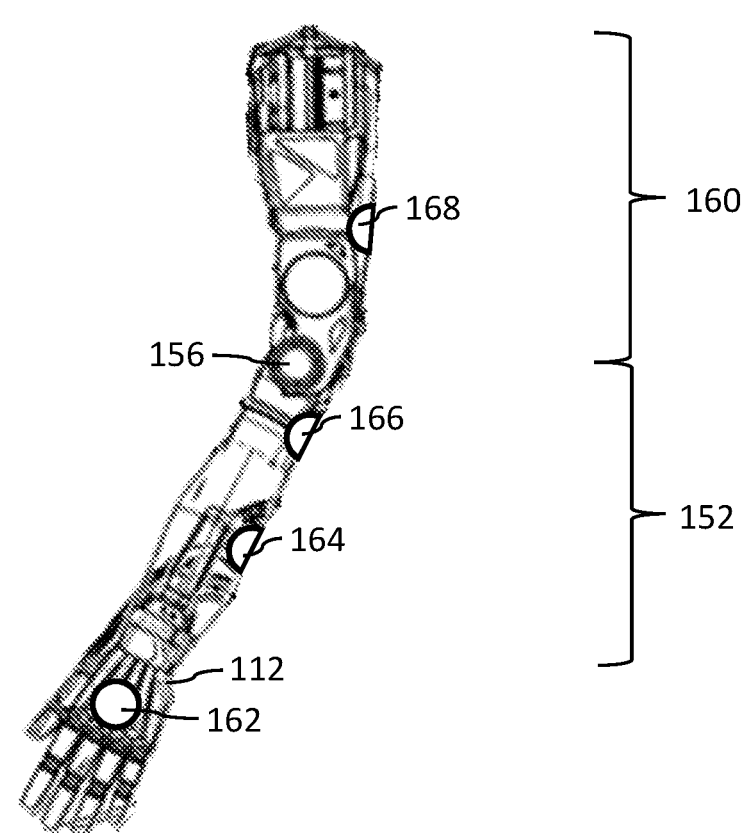
FIG. 1B is a schematic drawing of a side view of the robotic arm of the robot of FIG. 1A, in accordance with the present systems, devices, and methods.
Figure 2:
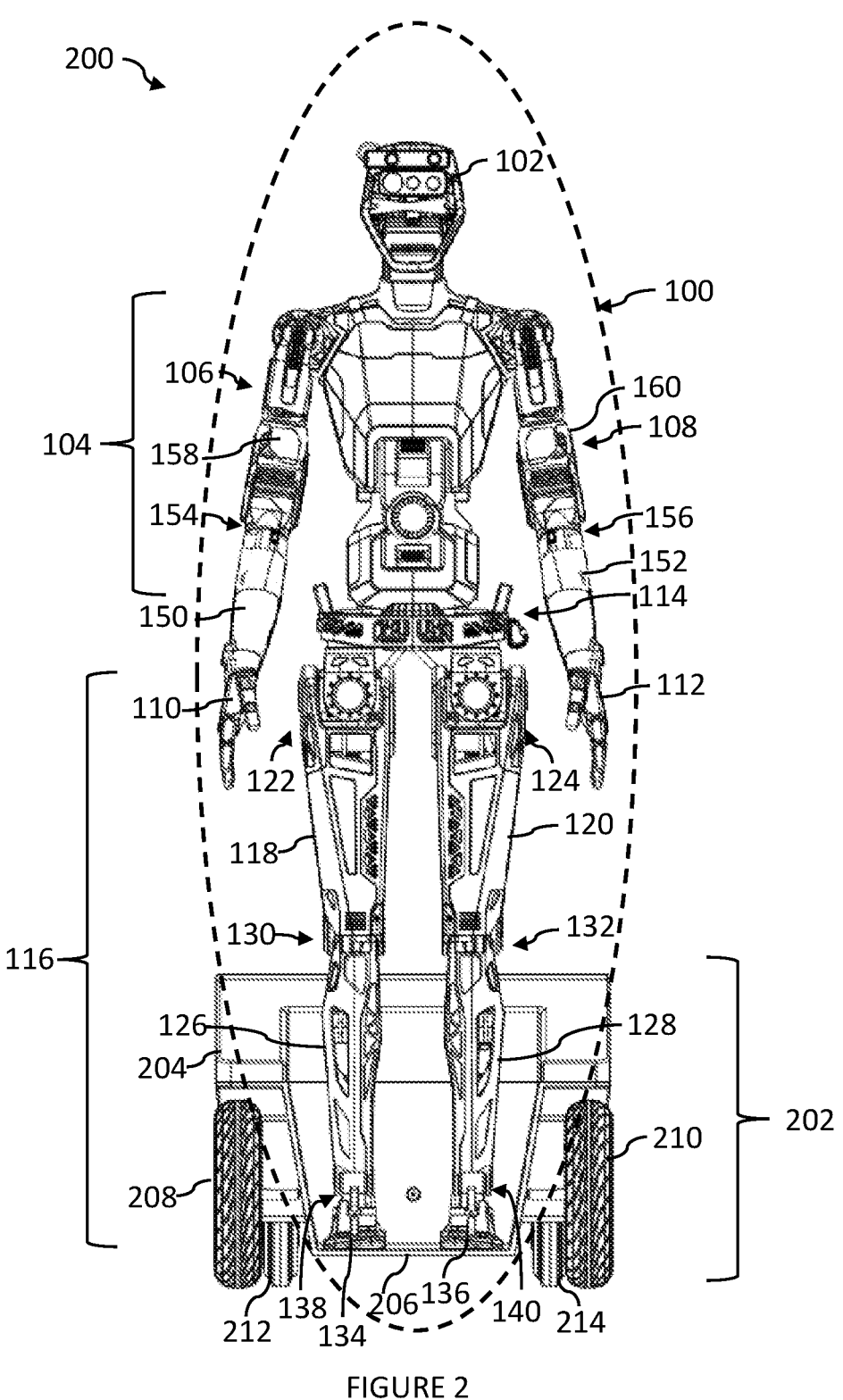
FIG. 2 is a schematic drawing of a front view of a mobile robot system that includes the robot of FIG. 1, in accordance with the present systems, devices, and methods.

Robot 100 is also shown in FIG. 2 described below. Elements of robot 100 in FIG. 2 have the same reference numerals as the corresponding elements of robot 100 in FIG. 1A. Robot 100 of FIGS. 1A, 1B, and 2 is described below with reference to FIG. 1A.

Robot 100 includes a head 102, a torso 104, robotic arms 106 and 108, and hands 110 and 112. Robot 100 is a bipedal robot, and includes a joint 114 between torso 104 and robotic legs 116. Joint 114 may allow a rotation of torso 104 with respect to robotic legs 116. For example, joint 114 may allow torso 104 to bend forward.

Robotic legs 116 include upper legs 118 and 120 with hip joints 122 and 124, respectively. Robotic legs 116 also include lower legs 126 and 128, mechanically coupled to upper legs 118 and 120 by knee joints 130 and 132, respectively. Lower legs 126 and 128 are also mechanically coupled to feet 134 and 136 by ankle joints 138 and 140, respectively. In various implementations, one or more of hip joints 122 and 124, knee joints 130 and 132, and ankle joints 138 and 140 are actuatable joints.

Robot 100 may be a hydraulically-powered robot. In some implementations, robot 100 has alternative or additional power systems. In some implementations, torso 104 houses a hydraulic control system, for example. In some implementations, components of the hydraulic control system may alternatively be located outside the robot, e.g., on a wheeled unit that rolls with the robot as it moves around (see, for example, FIG. 2 and accompanying description below), or in a fixed station to which the robot is tethered. The hydraulic control system of robot 100 may include a hydraulic pump, a reservoir, and/or an accumulator. Hydraulic hoses may provide hydraulic couplings between the hydraulic control system and one or more pressure valves.

Hands 110 and 112 of robot 100 include sensors 142 and 144, respectively. Lower legs 126 and 128 include sensors 146 and 148, respectively. Robotic arms 106 and 108 include forearms 150 and 152, elbows 154 and 156, and upper arms 158 and 160. Robot 100 may include sensors (not shown in FIG. 1A) on the back side of forearms 150 and 152, elbows 154 and 156, and upper arms 158 and 160. FIG. 1B shows the sensors on the back side of forearms 150 and 152, elbows 154 and 156, and upper arms 158 and 160.

Any of sensors 142, 144, 146, and 148 may be capacitive touch sensors, and may be operable to detect a contact between robot 100 and a human (not shown in FIG. 1). Detecting a contact between robot 100 and the human may include determining a capacitance of the sensor(s) 142, 144, 146, and/or 148 exceeds a predetermined capacitance threshold.

A sensitivity of sensors 142, 144, 146, and/or 148 may be tuned to permit detection of a direct contact with an area of exposed skin of the human, and/or may be tuned to permit detection of an indirect contact, for example, through clothing with an area of clothed human skin. Sensitivity of sensors 142, 144, 146, and/or 148 may be tuned to achieve a balance between false positive detections and false negative detections. The sensitivity of sensors 142, 144, 146, and/or 148 can be tuned, for example, by a) adjusting the size of the touch pad of sensors 142, 144, 146, and/or 148, b) changing the proximity and voltage level of a guard ring surrounding the touch pad sensors 142, 144, 146, and/or 148, and/or c) using an impedance bias.

One approach to achieving a balance between false positive detections and false negative detections is to implement a constant false alarm rate (CFAR) method which determines one or more thresholds used by sensors 142, 144, 146, and/or 148 to determine whether a contact has been detected. A lower threshold may result in more false positive detections. A higher threshold may result in more false negative detections. The threshold can be set, for example, to achieve a predetermined probability of false positive detections.

In some implementations, the balance between false positive detections and false negative detections can be improved by using multiple sensors to detect a contact. The multiple sensors may be sensors of the same type and/or sensors of different types (e.g., proximity sensors, capacitance sensors, visual sensors, and the like).

In some implementations (see FIG. 2 and accompanying description below), robot 100 may be part of a mobile robot system that includes a mobile base.

FIG. 1B is a schematic drawing of robotic arm 108 of robot 100 of FIG. 1A, in accordance with the present systems, devices, and methods. Robotic arm 108 includes hand 112, forearm 152, elbow 156, and upper arm 160. Robotic arm 108 includes a sensor 162 on the back of hand 112. Robotic arm 108 includes a sensor 164 on the back of forearm 152. Robotic arm 108 includes a sensor 166 on the back of elbow 156. Robotic arm 108 includes a sensor 168 on the back of upper arm 160. The locations of sensors 162, 164, 166, and 168 are examples of locations that are more likely than other locations on the robot to come into unexpected contact with an object in the robot's environment (e.g., a human) when robot 100 is in motion. The locations of sensors 162, 164, 166, and 168 may present more danger to humans in the environment of robot 100, and/or may be locations on robot 100 more vulnerable to damage resulting from an unexpected contact, e.g., a collision while robot 100 is in motion.

FIG. 2 is a schematic drawing of a front view of a mobile robot system 200 that includes robot 100 of FIG. 1, in accordance with the present systems, devices, and methods. Mobile robot system includes a mobile base 202. Mobile base 202 includes a chassis 204. Chassis 204 includes a platform 206 on which robot 100 is mounted. Mobile base 202 also includes wheels 208, 210, 212, and 214.

Figure 3:
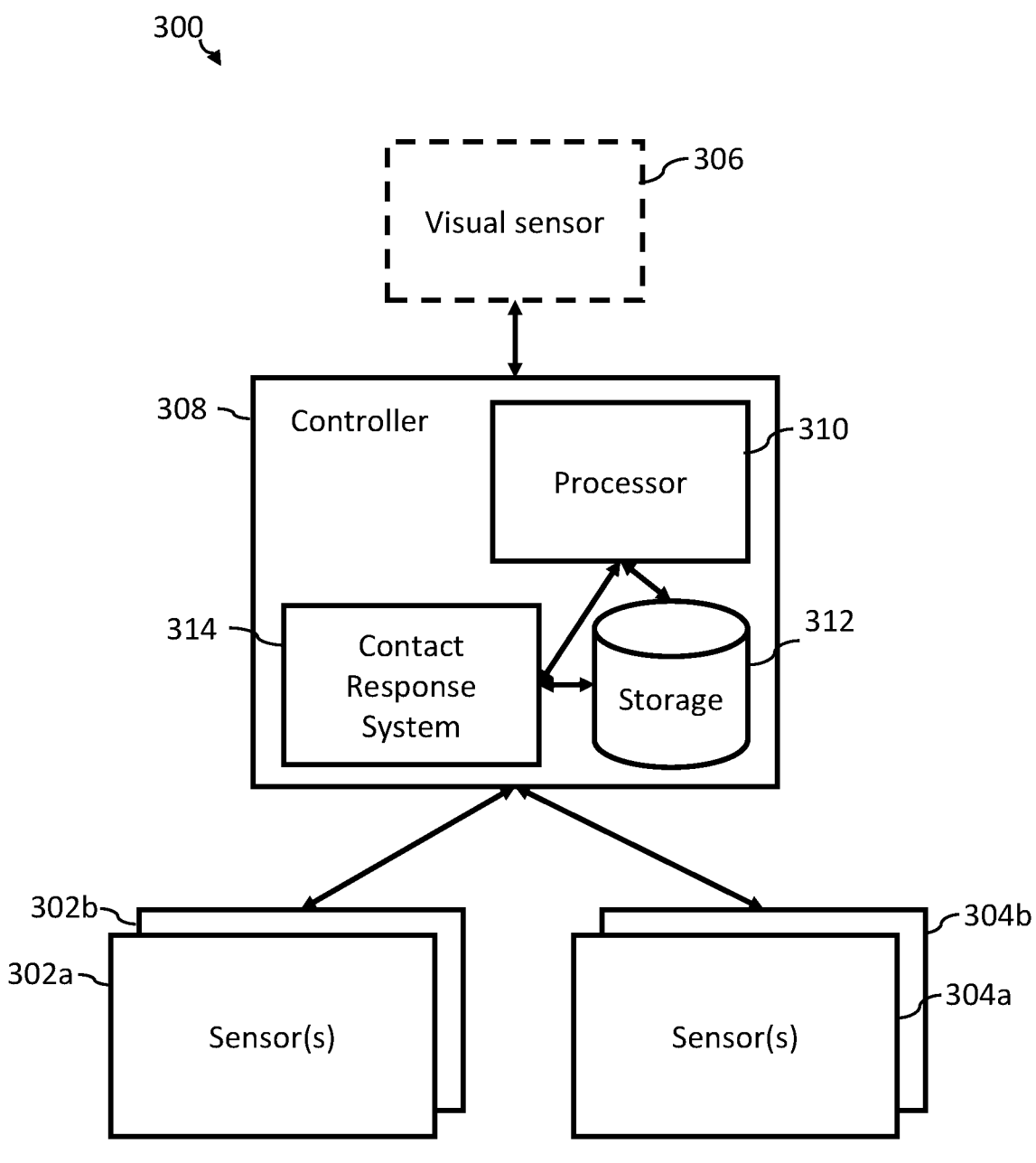
FIG. 3 is a block diagram of an example implementation of a control system 300 of the robot of FIG. 1, in accordance with the present systems, devices, and methods.

FIG. 3 is a block diagram of an example implementation of a control system 300 of robot 100 of FIGS. 1 and 2, in accordance with the present systems, devices, and methods.

Control system 300 includes a group of sensors 302. As an example, and for clarity in the drawing, only sensors 302a and 302b of sensor group 302 are shown. Group of sensors 302 may include more than two sensors 302a and 302b. Group of sensors 302 may be a single sensor. Sensors belonging to group of sensors 302 may be located close to one another, or located in related locations on robot 100 of FIG. 1. For example, group of sensors 302 may be located on hand 110 of robot 100 of FIG. 1 (see, for example, sensor 142 of FIG. 1).

Control system 300 also includes a group of sensors 304. As an example, and for clarity in the drawing, only sensors 304a and 304b of sensor group 304 are shown. Group of sensors 304 may include more than two sensors. Group of sensors 304 may be a single sensor. As described above in relation to group of sensors 302, sensors belonging to group of sensors 304 may be located close to one another, or located in related locations on robot 100 of FIG. 1.

In some implementations, one or more sensors of groups of sensors 302 and 304 is a capacitive touch sensor. Each capacitive touch sensor may include a respective first part (e.g., a touch pad) located on an external surface of the robot, which, when touched by (or when brought into physical contact with) a human, generates a signal indicating there is contact between the robot and the human. Each capacitive touch sensor may also include a respective second part (e.g., electronics) located elsewhere on the robot.

In some implementations, one or more sensors of groups of sensors 302 and 304 is a proximity sensor. A proximity sensor can be used to detect when an object in the robot's environment (e.g., a human) is close to the robot. In some implementations, a proximity sensor on the robot detects when a motion of the robot brings the proximity sensor close to a human. In some implementations, a proximity sensor on the robot measures a distance between the proximity sensor and the human. Some types of proximity sensors may include photoresistors, ultrasonic sensors and/or infrared transceivers. These types of proximity sensors can emit light and/or sound waves and can generate a signal when the emitted waves are disturbed by a closeness of an object in the robot's environment, e.g., a human.

Other types of proximity sensors may include inductive and/or capacitive elements. Inductive/capacitive proximity sensors may include inductive and/or capacitive detect a disturbance in an electromagnetic field, e.g., a disturbance caused by a human.

Control system 300 optionally includes a visual sensor 306.

Control system 300 includes a controller 308. Controller 308 is communicatively coupled to sensors of groups of sensors 302 and 304, and to visual sensor 306.

In some implementations, controller 308 comprises at least one processor 310. Processor 310 may be any logic processing unit, including for example, one or more central processing units ("CPUs"), digital signal processors ("DSPs"), and/or application-specific integrated circuits ("ASICs").

In some implementations, controller 308 comprises at least one non-transitory processor-readable storage medium 312 communicatively coupled to a processor by a bus. Storage medium 312 can store instructions and/or data that can be executed by processor. Storage medium 312 can store a computer program product comprising data and processor-executable instructions. The computer program product can cause controller 308 to provide commands to cause the robot to perform an action and/or a maneuver (e.g., a change in the robot's position and/or orientation in the robot's environment, to interrupt a motion of the robot, and the like). Storage medium 312 may be any suitable non-volatile storage medium, including for example, a hard disk drive for reading from and writing to a hard disk, a solid-state drive, an optical disk drive for reading from and writing to removable optical disks, and/or a magnetic disk drive for reading from and writing to magnetic disks.

Control system 300 includes a contact response system 314. Contact response system 314 can provide commands to cause the robot via controller 308 to execute the methods of operation of FIGS. 4A and 4B (see description below). Contact response system 314 may include hardware and/or software. Contact response system 314 may include, or employ, a processor (not shown in FIG. 3) which may be any logic processing unit, including for example, one or more central processing units ("CPUs"), digital signal processors ("DSPs"), and/or application-specific integrated circuits ("ASICs").

Figure 4A:
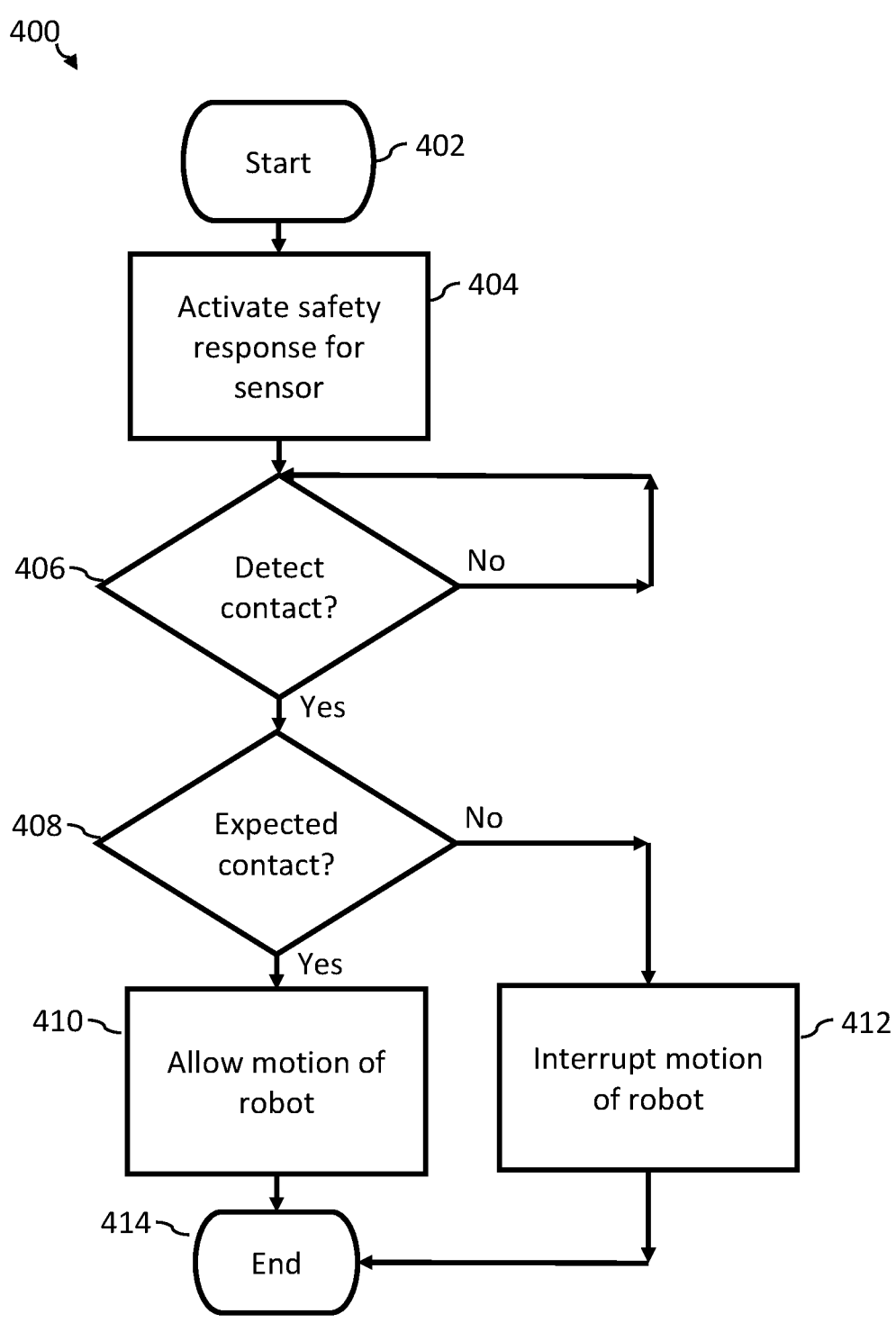
FIG. 4A is a flow chart of an example method of operation of a robot, in accordance with the present systems, devices, and methods.

FIG. 4A is a flow chart of an example method 400 of operation of a robot (for example, robot 100 of FIG. 1), in accordance with the present systems, devices, and methods. Method 400 of FIG. 4A includes seven (7) acts 402, 404, 406, 408, 410, 412, and 414. Those of skill in the art will appreciate that in alternative implementations certain acts of FIG. 4A may be omitted and/or additional acts may be added. Those of skill in the art will also appreciate that the illustrated order of the acts is shown for exemplary purposes only and may change in alternative implementations.

At 402, in response to a starting condition (e.g., a powering up of a controller e.g., controller 308 of FIG. 3), method 400 starts. The controller includes a contact response system (e.g., contact response system 314 of FIG. 3). At 404, the controller activates the contact response system for a sensor (e.g., a sensor of groups of sensors 302 and 304 of FIG. 3). At 406, the controller waits until the sensor detects a contact.

At 408, in response to detecting a contact by the sensor, the controller determines whether the contact is an expected contact. If the contact is an expected contact, method 400 proceeds to 410 where the controller allows the motion of the robot to proceed uninterrupted. In some implementations, allowing the motion of the robot to proceed uninterrupted includes deactivating the safety response for the sensor. If the contact is an unexpected contact, method 400 proceeds to 412 where the controller interrupts the motion of the robot.

Method 400 ends at 414.

Figure 4B:
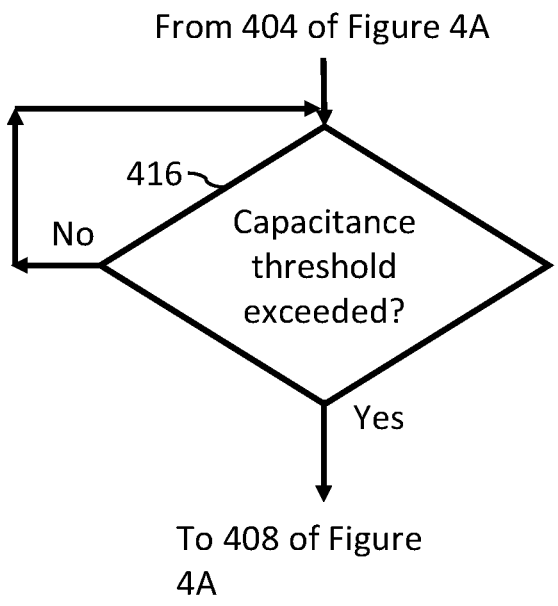
FIG. 4B is a flow chart of an example implementation of a method for the contact detection of FIG. 4A for a capacitance touch sensor, in accordance with the present systems, devices, and methods.

FIG. 4B is a flow chart of an example method 406 of the contact detection of FIG. 4A for a capacitance touch sensor, in accordance with the present systems, devices, and methods. Method 406 of FIG. 4B includes one act 416. Those of skill in the art will appreciate that in alternative implementations certain acts of FIG. 4B may be omitted and/or additional acts may be added. Those of skill in the art will also appreciate that the illustrated order of the acts is shown for exemplary purposes only and may change in alternative implementations.

Method 406 starts once the sensor is activated at 404 of FIG. 4A. At 416, method 406 waits until a physical contact between the robot and a human is established. Physical contact between the robot and the human may be established, for example, by a capacitive touch sensor (e.g., one of groups of sensors 302 and 304 of FIG. 3). If physical contact between the robot and the human is established at 422, method 406 proceeds to 408 of FIG. 4A.

Figure 4C:
FIG. 4C is a flow chart of an example implementation of a method for the contact detection of FIG. 4A for a proximity sensor, in accordance with the present systems, devices, and methods.
Figure 4C:
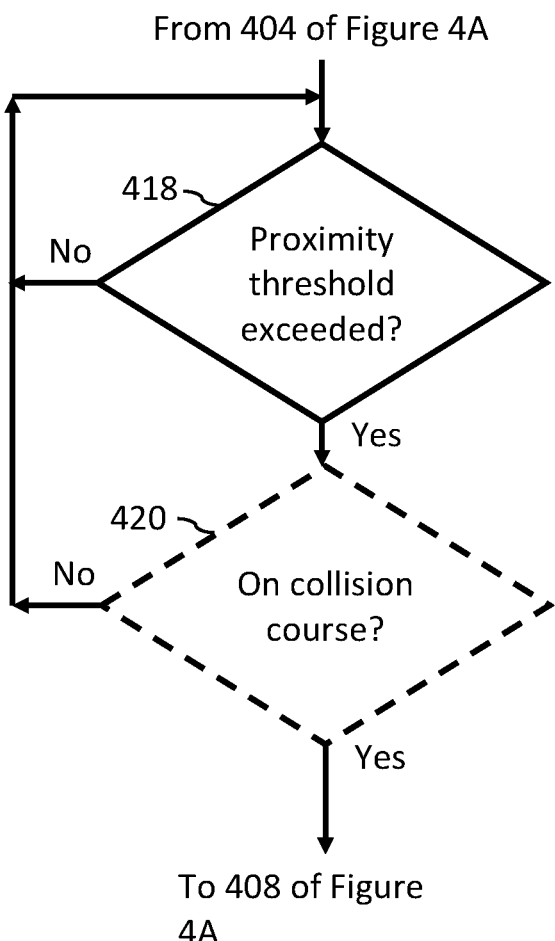

FIG. 4C is a flow chart of an example implementation of method 406 for the contact detection of FIG. 4A for a proximity sensor, in accordance with the present systems, devices, and methods. Method 406 of FIG. 4C includes two acts 418 and 420. Those of skill in the art will appreciate that in alternative implementations certain acts of FIG. 4C may be omitted and/or additional acts may be added. Those of skill in the art will also appreciate that the illustrated order of the acts is shown for exemplary purposes only and may change in alternative implementations.

Method 406 starts once the sensor is activated at 404 of FIG. 4A. At 418, method 406 waits until the sensor detects a proximity threshold is exceeded.

If the sensor detects the proximity threshold is exceeded, method 406 proceeds to 408 of FIG. 4A. Optionally (as indicated by the dotted lines in FIG. 4B), method 406 proceeds to 420 where the controller determines whether the robot is on a collision course with the human. In some implementations, determining whether the robot is on a collision course with the human includes tracking a trajectory of the robot, the human, or both. If the robot and the human are not on a collision course, method 406 returns to 418. If the robot and the human are on a collision course, method 406 proceeds to 408 of FIG. 4A.

In some implementations, the controller determines whether a sensor is a capacitance touch sensor or a proximity sensor. In these implementations, if the sensor is determined to be a capacitance touch sensor, method 400 of FIG. 4A incorporates method 406 of FIG. 4B. Conversely, if the sensor is determined to be a proximity sensor, method 400 of FIG. 4A incorporates method 406 of FIG. 4C.

The various implementations described herein may include, or be combined with, any or all of the systems, devices, and methods described in U.S. Provisional Patent Application Ser. No. 63/461,024, U.S. patent application Ser. No. 18/375,943, U.S. patent application Ser. No. 18/513,440, U.S. patent application Ser. No. 18/417,081, U.S. patent application Ser. No. 18/424,551, U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/316,693, U.S. Provisional Patent Application Ser. No. 63/253,591, U.S. Provisional Patent Application Ser. No. 63/293,968, U.S. Provisional Patent Application Ser. No. 63/293,973, and/or U.S. Provisional Patent Application Ser. No. 63/278,817, each of which is incorporated herein by reference in its entirety.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of operation of a humanoid robot, the humanoid robot comprising a torso, a head coupled to the torso, a visual sensor carried by the head, a controller, an arm coupled to the torso, and a capacitive touch sensor carried by the arm and positioned at a blind spot of the visual sensor, the capacitive touch sensor communicatively coupled to the controller and the controller comprising a processor communicatively coupled to a non-transitory processor-readable storage medium, the non-transitory processor-readable storage medium storing a contact response system and processor-executable instructions, the method comprising:

detecting, by the capacitive touch sensor, a first contact between the arm of the robot and a human, the first contact resulting from a first motion of the robot, wherein detecting, by the capacitive touch sensor, the first contact between the arm of the robot and the human includes determining a capacitance exceeds a predetermined capacitance threshold;

determining, by the controller, whether the capacitive touch sensor is in a field of view of the visual sensor;

determining, by the controller, whether the human is in the field of view of the visual sensor; and in response to determining that both the capacitive touch sensor and the human are not in the field of view of the visual sensor:

determining, by the controller, the first contact between the arm of the robot and the human is an unexpected contact; and activating a safety response of the contact response system, wherein the safety response of the contact response system causes the robot to interrupt the first motion of the robot.

2. The method of claim 1 further comprising:

in response to determining that both the capacitive touch sensor and the human are in the field of view of the visual sensor:

determining, by the controller, the first contact between the arm of the robot and the human is an expected contact; and allowing, by the contact response system, the robot to proceed uninterrupted with the first motion of the robot.

3. The method of claim 2, wherein the determining, by the controller, the first contact between the arm of the robot and the human is an expected contact includes tracking a trajectory of at least one of the arm of the robot and the human, and determining the arm of the robot and the human are on a course to establish contact with each other unless the first motion of the robot is interrupted.

4. The method of claim 1, wherein the capacitive touch sensor is a contact sensor and the detecting, by the capacitive touch sensor, a first contact between the arm of the robot and the human includes detecting the arm of the robot and the human have established contact with each other.

5. The method of claim 1, wherein the humanoid robot further comprises a proximity sensor and the method further comprises determining a distance between the robot and the human is less than a predetermined proximity threshold.

6. The method of claim 5, wherein the determining, by the controller, the first contact between the arm of the robot and the human is an unexpected contact includes:

tracking a trajectory of at least one of the arm of the robot and the human; and determining the arm of the robot and the human are on a course to establish contact with each other unless the first motion of the robot is interrupted.

7. The method of claim 1, wherein detecting a first contact between the arm of the robot and the human includes detecting a first contact between the arm of the robot and an area of exposed human skin of the human.

8. The method of claim 1, wherein detecting a first contact between the arm of the robot and the human includes detecting a first contact between the arm of the robot and an area of clothed human skin of the human.

9. The method of claim 1, wherein the safety response system that causes the robot to interrupt the first motion of the robot, causes the robot to halt the first motion of the robot.

10. A method of operation of a humanoid robot, the humanoid robot comprising a torso, a head coupled to the torso, a visual sensor carried by the head, a controller, an arm coupled to the torso, and a capacitive touch sensor carried by the arm and positioned at a blind spot of the visual sensor, the capacitive touch sensor communicatively coupled to the controller and the controller comprising a processor communicatively coupled to a non-transitory processor-readable storage medium, the non-transitory processor-readable storage medium storing a contact response system and processor-executable instructions, the method comprising:

detecting, by the capacitive touch sensor, a contact between the arm of the robot and a human, the contact resulting from a motion of the robot, wherein detecting, by the capacitive touch sensor, the contact between the arm of the robot and the human includes determining a capacitance exceeds a predetermined capacitance threshold;

determining, by the controller, whether the capacitive touch sensor is in a field of view of the visual sensor;

determining, by the controller, whether the human is in the field of view of the visual sensor;

determining, by the controller and based on whether both the capacitive touch sensor and the human are in the field of view of the visual sensor, whether the contact between the arm of the robot and the human is an expected contact or an unexpected contact;

in response to determining, by the controller, the contact between the arm of the robot and the human is an expected contact, allowing, by the contact response system, the robot to proceed uninterrupted with the motion of the robot; and in response to determining, by the controller, the contact between the robot and the human is an unexpected contact, causing, by the contact response system, the robot to interrupt the motion of the robot.

11. The method of claim 10, wherein the capacitive touch sensor is a contact sensor and the detecting, by the capacitive touch sensor, a contact between the arm of the robot and the human includes detecting the arm of the robot and the human have established contact with each other.

12. The method of claim 10, wherein the humanoid robot further comprises a proximity sensor and the method further comprises determining a distance between the robot and the human is less than a predetermined proximity threshold.

13. The method of claim 12, wherein the determining, by the controller and based on whether both the capacitive touch sensor and the human are in the field of view of the visual sensor, whether the contact between the arm of the robot and the human is an expected contact or an unexpected contact includes tracking a trajectory of at least one of the arm of the robot and the human, and determining whether the arm of the robot and the human are on a course to establish contact with each other unless the motion of the robot is interrupted.

14. The method of claim 12, wherein the determining whether the arm of the robot and the human are on a course to establish contact with each other unless the motion of the robot is interrupted includes performing, by the controller, a visual check to verify a presence of the human within the predetermined proximity threshold from the robot.

15. The method of claim 10, wherein detecting a contact between the arm of the robot and the human includes detecting a contact between the arm of the robot and an area of exposed human skin of the human.

16. The method of claim 10, wherein detecting a contact between the arm of the robot and the human includes detecting a contact between the arm of the robot and an area of clothed human skin of the human.

17. The method of claim 10, wherein causing by the controller, the robot to interrupt the motion of the robot includes causing, by the controller, the robot to halt the motion of the robot.

\* \* \* \* \*